United States Patent
Hart et al.

(10) Patent No.: US 7,512,466 B2
(45) Date of Patent: Mar. 31, 2009

(54) HIGH-TORQUE, LOW POWER REACTION WHEEL ARRAY AND METHOD

(75) Inventors: Robert J. Hart, Glendale, AZ (US); Mason A. Peck, Ithaca, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/170,837

(22) Filed: Jun. 30, 2005

(65) Prior Publication Data
US 2007/0023580 A1    Feb. 1, 2007

(51) Int. Cl.
*B60L 9/00* (2006.01)
*B60L 11/00* (2006.01)

(52) U.S. Cl. .............. 701/22; 701/36; 701/13; 180/7.1; 180/65.2; 244/165; 318/139

(58) Field of Classification Search ............ 701/13, 701/22, 36; 244/164–165, 3.21; 310/10, 310/15, 20; 180/7.1, 65.2; 903/942, 906, 903/914
See application file for complete search history.

(56) References Cited

U.S. PATENT DOCUMENTS

| | | | | |
|---|---|---|---|---|
| 3,868,072 A | * | 2/1975 | Fogarty | 244/167 |
| 4,735,382 A | * | 4/1988 | Pinson | 244/150 |
| 5,042,752 A | * | 8/1991 | Surauer et al. | 244/164 |
| 5,182,958 A | * | 2/1993 | Black | 74/84 R |
| 5,315,158 A | * | 5/1994 | Danielson | 290/1 R |
| 5,611,505 A | | 3/1997 | Smay | |

(Continued)

FOREIGN PATENT DOCUMENTS

EP    0922636 A1    6/1999

(Continued)

OTHER PUBLICATIONS

Low Cost Flywheel Energy Storage for a Fuel Cell Powered Transit Bus; Hearn, C.S.; Flynn, M.M.; Lewis, M.C.; Thompson, R.C.; Murphy, B.T.; Longoria, R.G.; Vehicle Power and Propulsion Conference, 2007. VPPC 2007. IEEE; Sep. 9-12, 2007 pp. 829-836; Digital Object Identifier 10.1109/VPPC.2007.4544239.*

(Continued)

*Primary Examiner*—Cuong H Nguyen
(74) *Attorney, Agent, or Firm*—Ingrassia Fisher & Lorenz, P.C.

(57) ABSTRACT

Methods and apparatus are provided for reaction wheel (RW) assemblies for spacecraft. The apparatus comprises a M/G coupled to an inertia wheel and a controller coupled to the M/G that, in response to commands it receives, couples power to or from an M/G of another RW assembly over a shared transfer connection ($V_{XFR}$), so that one M/G acts as a generator powering another M/G acting as a motor. The controller compares generator voltage $V_{GEN}$ to the BEMF of the motor on $V_{XFR}$ and reconfigures a multi-winding M/G or steps-up the generated voltage to maintain $V_{GEN} > V_{XFR}$ to maximize direct energy transfer from one RW to the other as long as possible. When $V_{GEN}$ declines sufficiently, the controller can couple the motor to the spacecraft power bus and/or the generator to a power dump so as to continue to provide the commanded torque if needed. Operation is automatic.

20 Claims, 7 Drawing Sheets

U.S. PATENT DOCUMENTS

| | | | |
|---|---|---|---|
| 5,934,395 | A * | 8/1999 | Koide et al. ............... 180/65.2 |
| 6,454,218 | B1 | 9/2002 | Jacobson |
| 6,682,019 | B2 | 1/2004 | Bailey |
| 6,966,866 | B2 * | 11/2005 | Ando et al. .................. 477/4 |
| 6,991,054 | B2 * | 1/2006 | Takaoka et al. ........... 180/65.2 |
| 7,023,150 | B2 * | 4/2006 | Hisada et al. ................ 318/34 |
| 7,056,260 | B2 * | 6/2006 | Nakamori et al. ............. 477/3 |
| 2007/0023580 | A1 * | 2/2007 | Hart et al. ................... 244/165 |

FOREIGN PATENT DOCUMENTS

| | | |
|---|---|---|
| EP | 1095852 A1 | 5/2001 |
| JP | 2001119811 A * | 4/2001 |
| WO | 2004005134 A1 | 1/2004 |

OTHER PUBLICATIONS

Skid prevention for EVs based on back-EMF observer and its implementation to IPM motor driven EV; Xiaoxing Liu; Koike, T.; Hori, Y.; Advanced Motion Control, 2006. 9th IEEE International Workshop on; Mar. 2006 pp. 212-217; Digital Object Identifier 10.1109/AMC.2006.1631660.*

Optimal traction control for EV utilizing fast torque response of electric motor; Liu, X.; Li, L.; Hori, Y.; Akiba, T.; Shirato, R.; Industrial Electronics Society, 2005. IECON 2005. 31st Annual Conference of IEEE; Nov. 6-10, 2005 pp. 6 pp. Digital Object Identifier 10.1109/IECON.2005.1569319.*

Skid prevention for EVs based on the emulation of torque characteristics of separately-wound DC Motor; Kodama, S.; Lianbing Li; Hori, Y.; Advanced Motion Control, 2004. AMC '04. The 8th IEEE International Workshop on; Mar. 25-28, 2004 pp. 75-80; Digital Object Identifier 10.1109/AMC.2004.1297645.*

Energy-momentum-wheel for satellite power and attitude control systems; Patel, M.R.; Energy Conversion Engineering Conference and Exhibit, 2000. (IECEC) 35th Intersociety; vol. 1, Jul 24-28, 2000 pp. 609-612 vol. 1 Digital Object Identifier 10.1109/IECEC.2000.870837.*

A review of technology developments in flywheel attitude control and energy transmission systems; Babuska, V.; Beatty, S.M.; deBlonk, B.J.; Fausz, J.L.; Aerospace Conference, 2004. Proceedings. 2004 IEEE; vol. 4, Mar. 6-13, 2004 pp. 2784-2800 vol. 4; Digital Object Identifier 10.1109/AERO.2004.1368076.*

Flywheel technology and potential benefits for aerospace applications; Christopher, D.A.; Donet, C.; Aerospace Conference, 1998. Proceedings., IEEE; vol. 1, Mar. 21-28, 1998 pp. 159-166 vol. 1; Digital Object Identifier 10.1109/AERO.1998.686815.*

Spacecraft flywheel systems-benefits, and issues; Pieronek, T.J.; Decker, D.K.; Spector, V.A.; Aerospace and Electronics Conference, 1997. NAECON 1997., Proceedings of the IEEE 1997 National; vol. 2, Jul. 14-17, 1997 pp. 589-593 vol. 2; Digital Object Identifier 10.1109/NAECON.1997.622703.*

Flight test demonstration of a flywheel energy storage system on the International Space Station;Edwards, J.; Aldrich, J.W.; Christopher, D.A.; Beach, R.F.; Barton, J.R.; Aerospace and Electronics Conference, 1997. NAECON 1997., Proceedings of the IEEE 1997 National;vol. 2, Jul. 14-17, 1997 pp. 617-621 vol. 2; Digital Object Identifier 10.11.*

A flywheel energy storage system test on the International Space Station; Christopher, D.A.; Beach, R.F.; Barton, J.R.; Energy Conversion Engineering Conference, 1997. IECEC-97. Proceedings of the 32nd Intersociety; vol. 3, Jul. 27-Aug. 1, 1997 pp. 1762-1766 vol. 3; Digital Object Identifier 10.1109/IECEC.1997.656689.*

Control designs for low-loss active magnetic bearings; Wilson, B.C.; Tsiotras, P.; Heck-Ferri, B.; Advanced Intelligent Mechatronics. Proceedings, 2005 IEEE/ASME International Conference on; 2005 pp. 1097-1102; Digital Object Identifier 10.1109/AIM.2005.1511156.*

Balcones homopolar generator power supply; Gully, J.H.; Hildenbrand, D.J.; Weldon, W.F.; Magnetics, IEEE Transactions on vol. 25, Issue 1, Jan. 1989 pp. 210-218; Digital Object Identifier 10.1109/20.22536.*

EP Search Report, 06116355.6 dated Feb. 14, 2008.

Panagiotis Tsiotras, Haijun Shen, and Chris Hall, Satellite Attitude Control and Power Tracking with Energy/Momentum Wheels, Journal of Guidance, Control, and Dynamics, Jan.-Feb. 2001, vol. 24, No. 1.

* cited by examiner

HIGH-TORQUE, LOW POWER REACTION WHEEL ARRAY AND METHOD

TECHNICAL FIELD

The present invention generally relates to controlled momentum transfer apparatus and methods, and more particularly controlled momentum transfer using two or more electrically coupled reaction wheels.

BACKGROUND

Modern spacecraft use control moment gyros (CMGs) and/or rotating inertia wheels to provide attitude control. Inertia wheels combined with motor generators (M/Gs) are commonly referred to as reaction wheels (RWs). Multiple RWs may be combined to form a reaction wheel array or assembly (RWA). In general multiple CMGs or RWs oriented in different directions are used. Angular momentum stored in rotating inertia wheels within the CMGs or RWAs is converted to torque which is exchanged with the spacecraft to change its attitude in space. Torque is the time derivative of angular momentum. Reaction wheels have also been proposed for energy storage in spacecraft, a separate function. Sometimes, RWAs have been used in a combined function wherein they provide torque for attitude control and also exchange electrical energy with the spacecraft power bus.

An important consideration in spacecraft design, operation and capability is the power drain placed on the spacecraft power supply and the load placed on the spacecraft energy dissipation system (energy dump) to accelerate and decelerate the rotors during operation of the CMGs and RWAs. In general, CMGs use constant speed motors, require relatively low peak power and deliver higher torque but are significantly more complex and relatively expensive. RWAs are less expensive and sometimes easier to implement but achieving high torque over the desired momentum range usually requires high peak power input and/or dissipation that is often beyond the capability of many spacecraft. The power problems associated with conventional RWAs are more severe in smaller spacecraft where cost, power, weight, and reaction time are critical factors. Accordingly there continues to be a need for momentum control and torque transfer devices that are well suited for smaller spacecraft, that is, that combine relatively low cost and high torque capability with low peak power drain and energy dissipation.

Accordingly, it is desirable to provide improved momentum control apparatus and methods that are suited for use in smaller spacecraft or spacecraft requiring high torque at comparatively low cost with low peak power drain and dissipation. In addition, it is desirable that the apparatus and method be simple, rugged and reliable. It is further desirable to use RWA type momentum control devices in a way that can provide high torque without creating large peak loads on the spacecraft power and dissipation system. Still further, other desirable features and characteristics of the present invention will become apparent from the subsequent detailed description and the appended claims, taken in conjunction with the accompanying drawings and the foregoing technical field and background.

BRIEF SUMMARY

A spacecraft attitude control apparatus is provided. The apparatus comprises at least first and second reaction wheel assemblies (RWAs), each comprising an inertia wheel (IW), a motor-generator (M/G) rotationally coupled to the inertia wheel for adding energy to or removing energy from the inertia wheel, a power flow controller electrically coupled to the M/G, adapted to control operation of the M/G as motor or generator. The power flow controller comprises an I/O port adapted to provide energy to or receive energy from a power flow controller of another reaction wheel assembly when a voltage generated by a decelerating M/G exceeds a back EMF of an accelerating M/G. Higher spacecraft steering torque can be obtained because the momentum or torque transfer from one RWA to another is not limited by the spacecraft power supply capacity or the spacecraft energy dissipation capacity.

A spacecraft attitude control method is provided for exchanging energy, in response to a command, between at least first and second reaction wheel assemblies (RWA) joined by an energy transfer bus, wherein each reaction wheel assembly comprises an inertia wheel rotationally coupled to a motor-generator (M/G) coupled to the energy transfer bus. The method comprises configuring a first M/G of the first RWA as a generator to provide energy to the transfer bus while decelerating, configuring a second M/G of the second RWA as a motor to receive energy from the transfer bus while accelerating, and sending energy from the first RWA to the second RWA over the energy transfer bus. In an exemplary embodiment, the first and second M/Gs comprise low ("L") voltage and high ("H") voltage connections, the first configuring step further comprises coupling the "H" voltage connection of the first M/G to the transfer bus while decelerating the first M/G and the second configuring step further comprises coupling the "L" voltage connection of the second M/G to the transfer bus while accelerating the second M/G.

BRIEF DESCRIPTION OF THE DRAWINGS

The present invention will hereinafter be described in conjunction with the following drawing figures, wherein like numerals denote like elements.

FIG. 10 illustrates the method for determining whether a reaction wheel should accelerate or decelerate, FIG. 11 illustrates the method for an accelerating wheel and FIG. 12 illustrates the method for a decelerating wheel.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The invention uses one more reaction wheel than is mathematically necessary merely for producing the desired momentum change. This provides one or more mathematical degree of freedom for energy manipulation in addition to those needed merely for momentum manipulation via torque transfer to and from the spacecraft. For example, a single-axis array of wheels of the present invention uses at least two reaction wheels and a three axis array uses at least four reaction wheels, and so forth. The invention provides high steering torque and reduced peak spacecraft power drain (or dissipation) for spacecraft maneuvers by transferring energy directly between decelerating and accelerating reaction wheels whenever possible. This transfer reduces the peak load on the spacecraft power bus and dissipation capability while providing higher maneuvering torque. This reduction in power and increase in torque is a significant advantage over the prior art.

Figure 1:
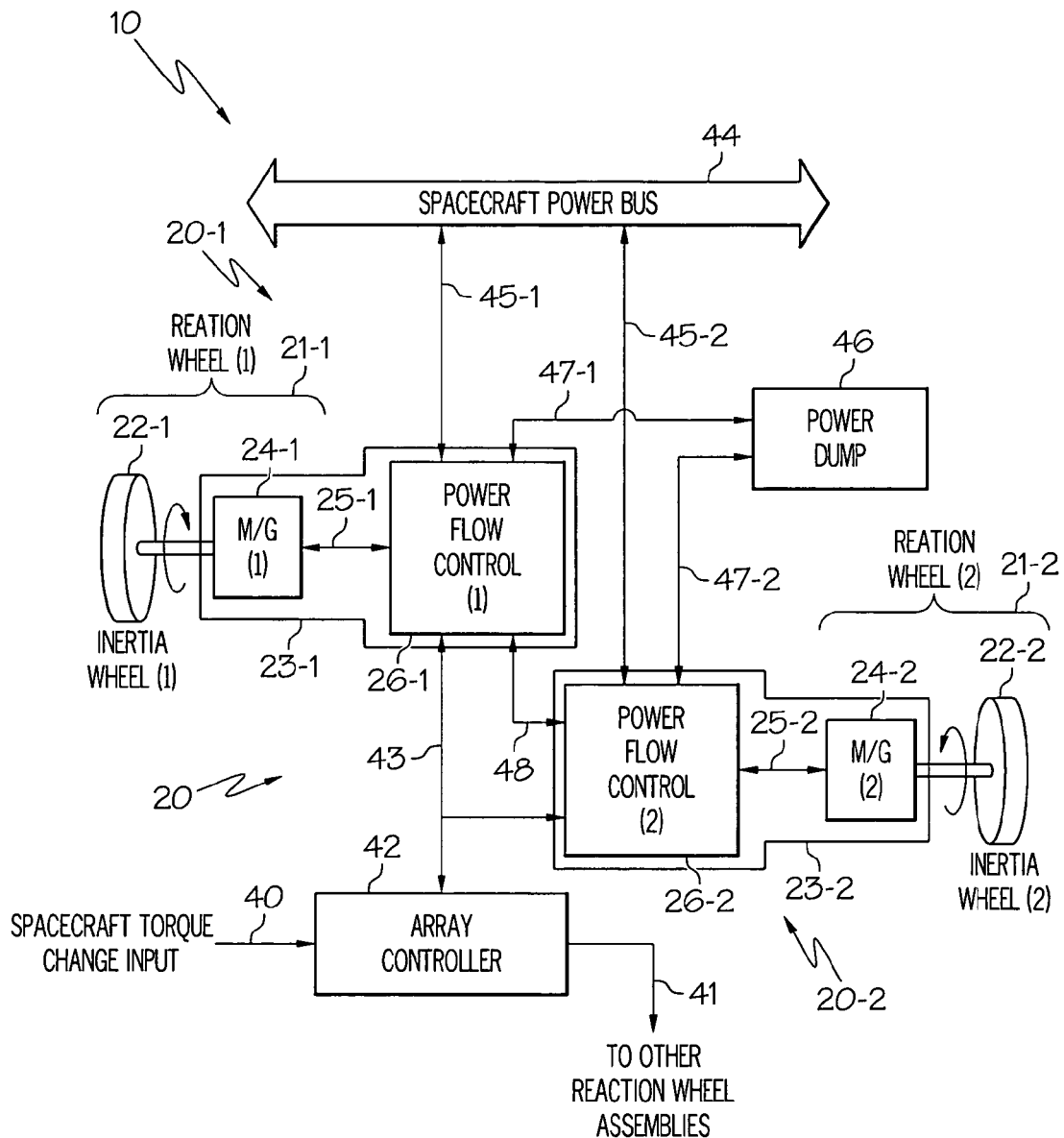
FIG. 1 shows a simplified schematic block diagram of an attitude control system with two coupled reaction wheels and associated power flow control assemblies according to an exemplary embodiment of the present invention.

FIG. 1 shows a simplified schematic block diagram of attitude control system 10 comprising two coupled reaction wheel assemblies or arrays (RWAs) 20-1, 20-2 (collectively 20) and array controller 42, according to the present invention. Reaction wheel assemblies 20 comprise inertia wheels (RWs) 22-1, 22-2 (collectively 22), motor-generators (M/G) 24-1, 24-2 (collectively 24) and power flow controls 26-1, 26-2 (collectively 26). Inertia wheels 22 are rotationally coupled to M/Gs 24. M/Gs 24 are electrically coupled to power flow controls 26 by leads or bus 25-1, 25-2 (collectively 25). The combination of inertia wheel 22 and associated M/G 24 is referred to as reaction wheel (RW) 21-1, 21-2 (collectively 21). The combination of M/G 24 and associated power flow control 26 is referred to as power flow control assembly 23-1, 23-2 (collectively 23). Electrical bus or leads 48 extending between power flow controls 26-1 and 26-2 couple reaction wheel assemblies 20-1, 20-2. While only two reaction wheel assemblies 20-1, 20-2 are shown in FIG. 1, this is merely for convenience of description and any number can be used. A pyramid of four RWs is convenient for providing three axis spacecraft attitude control. Reaction wheel assemblies 20 are coupled in parallel to reaction wheel array controller 42 via leads or bus 43, to spacecraft power bus 44 via leads or bus 45-1, 45-2, etc., (collectively 45), to power dump 46 via leads or bus 47-1, 47-2, etc., (collectively 47) and to each other via power transfer (XFR) leads or bus or connection 48. In the discussion that follows, it is assumed that reaction wheel assemblies 20 are substantially identical (other than orientation in space) but this is merely for convenience of explanation and not essential nor intended to be limiting. Each reaction wheel assembly 20 comprises inertia wheel 22, motor-generator (M/G) 24 and power flow control 26.

In the quiescent state, that is, when no attitude change commands are being executed by attitude control system 10, inertia wheels 22 and their associated M/Gs 24 (reaction wheels 21) are desirably running at a predetermined speed, preferably at the speed corresponding to about half their maximum kinetic-energy storage capability, although larger and smaller values can also be used. This is referred to as the off-set or quiescent speed bias. In this state, reaction wheel assemblies 20 store significant energy, but not necessarily momentum. In an inertial frame momentum is conserved so that, for example, if a spinning reaction wheel is decelerated the resulting torque causes the spacecraft angular momentum around an axis parallel to the reaction wheel axis to increase by an equal amount, and vice-versa if the reaction wheel is accelerated. Thus, torque created by decelerating or accelerating reaction wheels can transfer momentum back and forth between the reaction wheels and the spacecraft. This is used to change the attitude of the spacecraft. The desired attitude is determined by the spacecraft attitude-control system (not shown) or ground control signals or both and then communicated to system 10. System 10 then executes the desired attitude change. When a torque or momentum change command or request is received on input 40 to array controller 42 (e.g., from the spacecraft management system), array controller 42 allocates (distributes) the torque command to the various reaction wheels in order to accomplish the attitude change, that is, determines which of reaction wheels 22 should speed up (accelerate=positive torque) and which should slow down (decelerate=negative torque).

In the prior art, the maximum torque and therefore the rate at which momentum and attitude changes could be accomplished was generally limited by the rate at which power (e.g., current) could be supplied from spacecraft power bus 44 or dissipated in spacecraft power dump 46. In smaller spacecraft with limited peak power capability, rapid (high torque) attitude changes could not be accomplished without overloading the power bus and/or the power dump. The present invention avoids this problem by using the energy stored in decelerating reaction wheels to directly power accelerating reaction wheels. This is accomplished by power flow control units 26 in combination with M/Gs 24. If, for example, reaction wheel 21-1 needs to decelerate and reaction wheel 21-2 needs to accelerate, then power flow control 26-1 configures M/G 24-1 to act as a generator driven by the rotational energy stored in reaction wheel 21-1. The energy generated by M/G 24-1 is transferred by power flow control 26-1 over coupling transfer (XFR) lead or bus connection 48 to power flow control 26-2 which configures M/G 24-2 to act as a motor thereby spinning-up reaction wheel 21-2. The current and therefore the torque that can be generated is no longer limited by the capacity of spacecraft power bus 44 and/or power dump 46 and much more rapid maneuvers can be executed. This is a particular advantage of the invention. However for this to work over a wide range of rotor speeds, the back electromotive force (Back-EMF or BEMF) produced by the M/Gs acting as motors and the voltage output when they act as generators must be appropriately managed.

Figure 2:
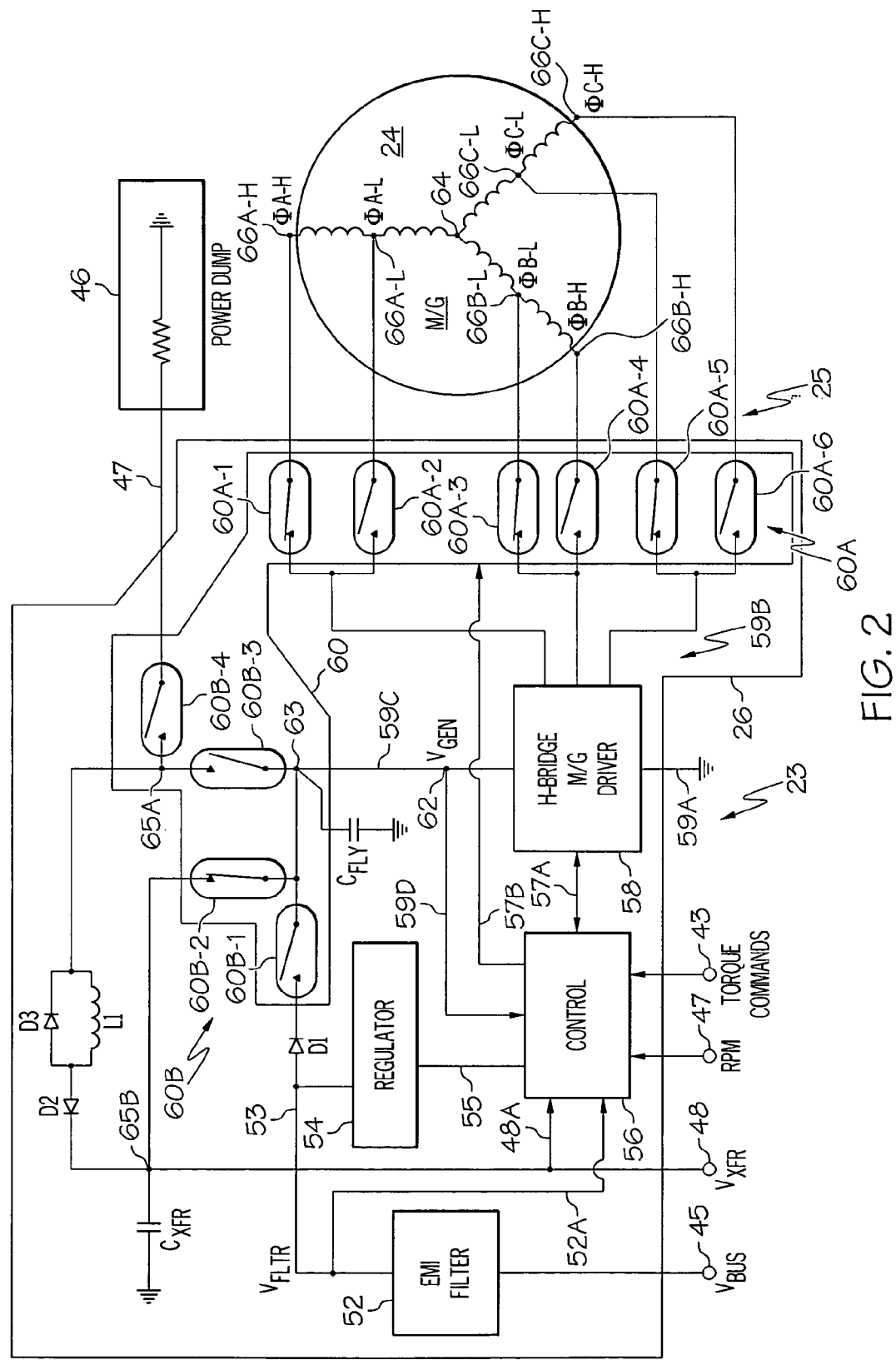
FIG. 2 is a simplified electrical schematic block diagram of the electrical portion of a reaction wheel assembly illustrated in FIG. 1 according to an exemplary embodiment of the invention and showing further details.

FIG. 2 is a simplified electrical schematic block diagram of power flow assembly 23 of a reaction wheel assembly 20 illustrated in FIG. 1, according to an exemplary embodiment of the invention showing further details. Power flow assembly 23 comprises M/G 24 and power flow control 26. There are desirably several I/O terminals (plus ground) coupled to power flow control 26 of power flow control assembly 23 of reaction wheel assembly 20. For example, (i) power bus connection 45 that receives $V_{BUS}$, the voltage provided by spacecraft power bus 44, (ii) torque command input 43 for the torque requests determined by array controller 42 based on attitude change input 40 from the spacecraft management or attitude control system (not shown), (iii) connection 47 to power dump 46, (iv) transfer (XFR) bus or lead connection 48 coupled to the other reaction wheel assemblies and carrying voltage $V_{XFR}$ being received from or sent to the other reaction wheel assemblies, and (v) speed (RPM) input 47 which provides information on the rotation speed of M/G 24 and inertia wheel 22 (collectively reaction wheel 21). M/G speed may be derived from a tachometer (e.g., via a Hall-effect sensor) coupled to the M/G or from electrical signals supplied to or BEMF received from M/G 24 since the ripple voltages generally have predetermined relationship to the M/G speed. Any means or method for deriving a signal proportional to M/G speed can be used. Power dump 46 conveniently comprises a resistor for converting excess electrical energy into heat for dissipation from the spacecraft, however any electrical energy dissipation element may be used.

Power flow control 26 desirably comprises optional electromagnetic interference (EMI) filter 52 coupled to $V_{BUS}$ input 45 for removing electrical noise from the bus power voltage $V_{BUS}$. Voltage $V_{FLTR}$ derived from $V_{BUS}$ appears on leads 52A and 53 from the output of EMI filter 52. Regulator 54 is coupled via leads 53 to the output of EMI filter 52 for providing a stabilized power source for control unit 56 via leads 55. Control unit 56 is provided for managing the power flow within and outside of power flow control 26 and controlling H-bridge motor-generator driver 58. Control unit 56 receives power (e.g., regulated $V_{FLTR}$) via leads 55, torque commands via input 43, M/G speed for example via input 47, and transfer (XFR) bus or leads voltage $V_{XFR}$ via connection 48A coupled to $V_{XFR}$ I/O terminal 48. Control 56 provides control output 57A to H-bridge M/G driver 58 and control output 57B to switches or relays 60. Control 56 also receives voltage $V_{GEN}$ via leads 59D from node 62 coupled to output 59C of H-bridge M/G driver 58. $V_{GEN}$ is the voltage being produced by M/G 24 when operating as a generator. H-bridge M/G driver 58 receives control inputs via leads 57A from control 56 and is coupled to ground (reference potential) lead 59A, to M/G 24 via leads or bus 59B, switches 60A and leads 25. H-bridge driver 58 also feeds power I/O lead 59C coupled to node 62 and switches 60B via node 63. In the example of FIG. 2, M/G 24 is shown as being a three-phase dual winding brushless direct current (BLDC) motor-generator (M/G). However this is not essential and not intended to be limiting. What is important is that M/G 24 and/or its associated drive electronics, when it is acting as a generator, be capable of producing output voltages over the largest possible range of speeds that are greater than the BEMF of the motor(s) that it is driving in other reaction wheel assemblies 20.

In M/G 24, the three phases ΦA, ΦB, ΦC are connected in "Y" configuration with common node 64 and output nodes 66A-H, 66B-H, 66C-H and 66A-L, 66B-L, 66C-L at approximately the end-point and mid-point respectively of each phase winding ΦA, ΦB, ΦC. While having nodes 66A-L, 66B-L and 66C-L at the mid-points of the phase windings is convenient, it is not essential, and those nodes may be at larger or smaller fractions of the phase winding depending upon the needs of the system designer and/or user. The suffixes "H" and "L" standing for high and low are intended to identify the high voltage and low voltage windings or connections, respectively. Leads 25 of M/G 24 are coupled through switches 60A to leads 59B from H-Bridge M/G Driver 58. Switches 60A comprise switches 60A-1 thru 60A-6, where switches 60A-1, 60A-4, and 60A-6 are coupled respectively between leads 59B and phase nodes 66A-H. 66B-H, 66C-H, and switches 60A-2, 60A-3, 60A-5 are coupled respectively between leads 59B and phase nodes 66A-L, 66B-L, 66C-L, for each phase ΦA, ΦB, ΦC. Control 56 commutates switches 60A-1 through 60A-6 (whether H or L) and H-bridge driver 58 so as to cause M/G 24 to act as a motor or a generator and rotate in the desired direction. Persons of skill in the art understand how such commutation is performed, that is, not all of switches 60A (whether H or L) are closed at the same time, but open and close in such a way as to steer currents to/from the desired windings at different instants of time to control operation of M/G 24. Examples of the operation of H-bridge driver 58 for different modes of operation of M/G 24 are provided in FIGS. 4-9.

While switches 60A control coupling of M/G 24 to driver 58, switches 60B control coupling of M/G 24 (e.g., of reaction wheel assembly 20-1) to $V_{FLTR}$ via leads 53, to power dump 46 via leads 47 and/or to $V_{XFR}$ via nodes 65A, 65B and connection 48 to other reaction wheel assemblies 20-2, 20-3, 20-4, etc. Which of the various switches 60B are open or closed depends on whether M/G 24 is functioning as a motor or a generator and on the relative magnitude of $V_{XFR}$ (the voltage on transfer XFR bus at connection 48), $V_{GEN}$ (the voltage produced by M/G 24 when operating as a generator), and on $V_{FLTR}$ (the voltage derived from the spacecraft bus voltage $V_{BUS}$ via EMI filter 52). When M/Gs 24 of reaction wheel assemblies 20 are stopped or operating at very low speed so that the back-EMF voltage ($V_{BEMF}$) is less than $V_{FLTR}$ or $V_{BUS}$, then input switch 60B-1 is closed so that M/Gs 24 of assemblies 20 may be spun-up from spacecraft power bus 44 via connection 45. This may be done slowly so as to not create an excessive current demand on power bus 44. By spinning them all up at the same time with appropriate selection of spin direction, the net torque on the spacecraft may be held at zero so that no attitude change occurs (although that is not precluded). Once M/Gs 24 are operating at their predetermined speed bias (e.g., the speed for half-maximum energy storage) then switch 60B-1 is generally left closed until an attitude change command (e.g., a spacecraft attitude change command or request) is received. This arrangement provides enough current via driver 58 to overcome the friction and other losses associated with driver 58 and M/Gs 24. Thus, M/Gs 24 remain in their predetermined speed bias status until array controller 42 receives an attitude change input. When an attitude change request is received by array controller 42 and the appropriate torque commands are sent to control 56, input switch 60B-11 opens and either switch 60B-2 or 60B-3 closes depending upon whether the particular reaction wheel assembly 20-1, 20-2, etc., is intended to function as a motor (accelerate) or a generator (decelerate). At this stage, output switch 60B-4 remains open. If the particular assembly, e.g., 20-1, is intended to function as a motor (accelerate), then input switch 60B-2 closes and output switch 60B-3 remains open. If assembly 20-1, 20-2, etc., is intended to function as a generator (decelerate) then input switch 60B-2 remains open and output switch 60B-3 is closed. Under the latter circumstance, $V_{GEN}$ appearing at nodes 63, 65A is passed via inductor L1 and diodes D2, D3 to node 65B. Node 65B is coupled to capacitor $C_{XFR}$ and provides $V_{XFR}$ to output connection 48 and the other reaction wheel assemblies coupled thereto. Capacitor $C_{XFR}$ can store electrical energy while assembly 20 is idling at the predetermined speed bias, and can provides additional drive current when assembly 20 is responding to a high torque request. Capacitor $C_{FLY}$ is desirably but not essentially coupled from node 63 to ground (spacecraft common) and provides additional energy storage and filtering. Diode D1 is desirably provided to prevent $C_{FLY}$ from discharging through EMI filter 52, but this is not essential.

If M/G 24-1 continues to decelerate while functioning as a generator, $V_{GEN}$ may eventually become smaller than $V_{BEMF}$ of the other M/Gs 24-2. 24-3, etc., that it is driving. $V_{BEMF}$ appears on XFR bus connection 48 which is coupled to control 56 via lead 48A. When this occurs no more energy can be coupled to the other reaction wheels and the only way in which M/G 24-1 can continue to decelerate is by dumping energy into power dump 46 via leads 47. This is accomplished by closing output switch 60B-4, which remains closed until no further deceleration is needed or M/G 24-1 stops. Diode D2, isolates M/G/24-1 from transfer leads or bus connection 48 when this situation occurs. After the maneuver is completed, those of M/Gs 24 that have stopped or whose output voltage $V_{GEN}$ has fallen below $V_{XFR}$ are slowly spun up again using $V_{BUS}$ or $V_{FLTR}$ via input switch 60B-1. In a further mode of operation where M/G 24-1 of FIG. 2 is intended to act as a motor (accelerating), then input switch 60B-2 is closed and output switches 60B-3 and 60B-4 are open. When $V_{XFR}$ received from other assemblies 20-2, 20-3, etc., via connection 48 is greater than $V_{BEMF}$ of M/G 24-1, M/G 24-1 can function as a motor driven by VXFR, and inertia wheel 22-1 attached to M/G 24-1 accelerates. This can continue as long as $V_{XFR} > V_{BEMF}$.

Figure 3:
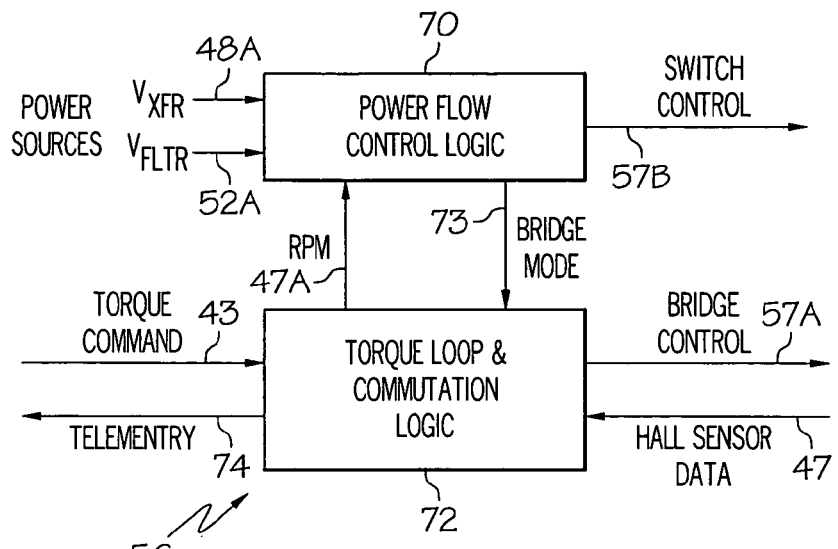
FIG. 3 is a simplified schematic block diagram of the control function of FIG. 2, showing further detail.
Figure 8:
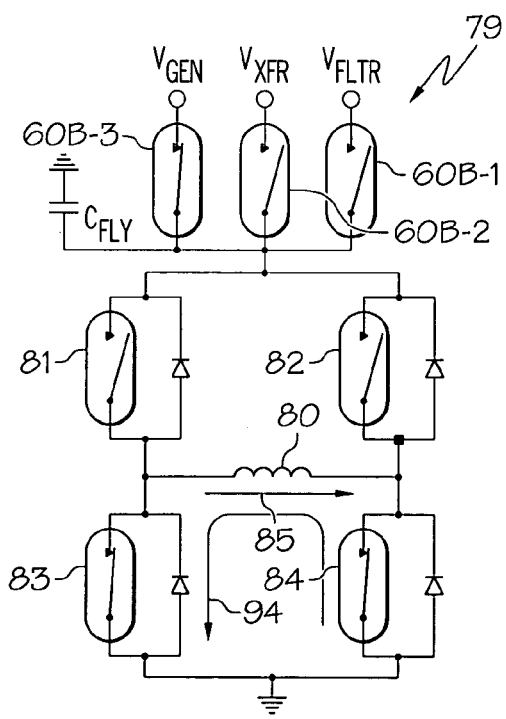
Figure 9:
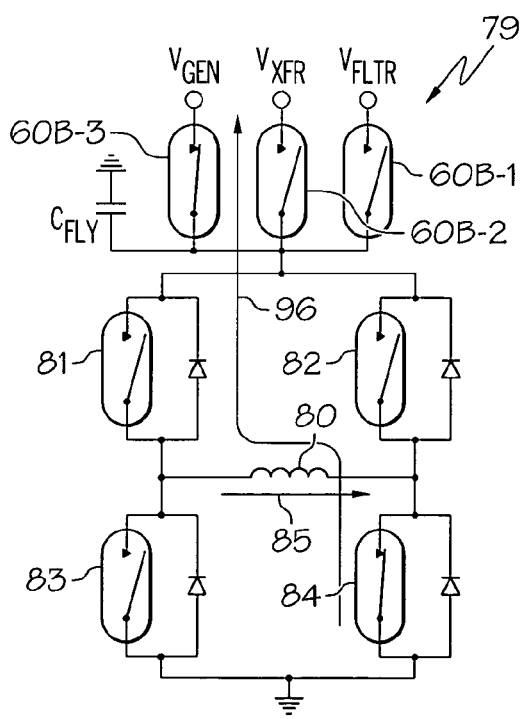
Figure 12:
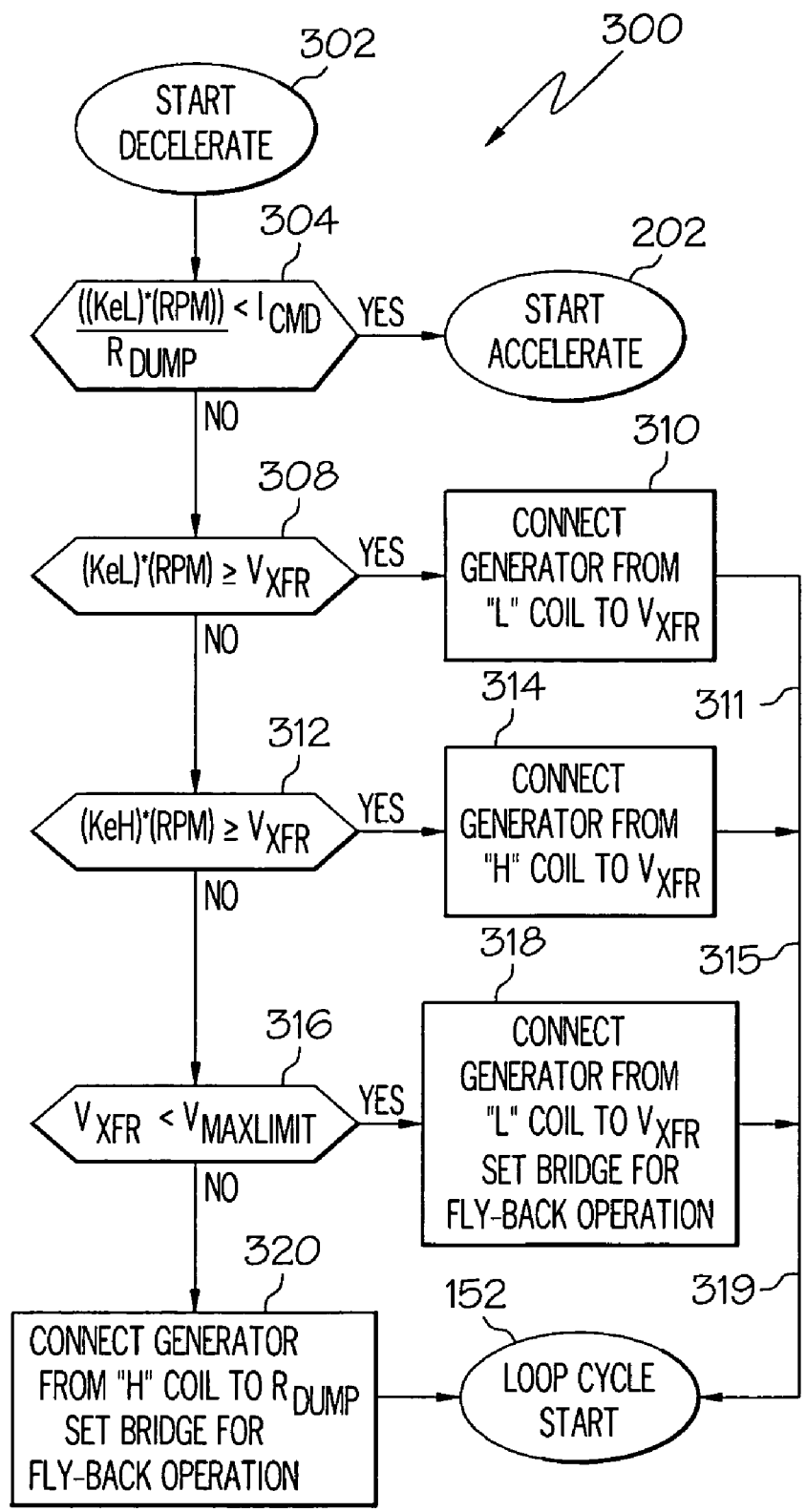

FIG. 3 is a simplified schematic block diagram of control 56 of FIG. 2, showing further detail. Control 56 comprises power flow control logic 70 and torque loop commutation logic 72. The control logic in FIG. 3 blocks 70 and 72 can be implemented in hardware using dedicated analog or digital logic elements or in software using a programmable processor with requisite program memory and interfaces. Analog to digital converters are desirably used to convert the $V_{XFR}$ and $V_{FLTR}$ voltages to digital words. The torque commands and telemetry interfaces can be serial digital or analog as required for the system. Serial digital is convenient for a digital controller implementation. The Hall sensor data, switch control and bridge control lines are normally digital signals, however Hall sensor devices usually need post-amplification prior to input to the control logic. Processor real-time counters can be used in block 72 to convert the Hall sensor data stream to digital word scaled to RW rotational speed word for use in the block 70 logic. The switch control lines are conveniently driven directly from the processor general purpose I/O port if logic-level semiconductor power switches are used to implement the H-bridge and control switches. Power flow control logic 70 receives voltages $V_{XFR}$ on leads 48A and $V_{FLTR}$ (or $V_{BUS}$) on leads 52A and receives speed (RPM) information on leads 47A from torque and commutation logic 72, and provides control signals for switches 60 via leads or bus 57B, and provides bridge operating mode selection to torque loop and commutation logic 72 via leads of bus 73. The bridge mode signals on leads or bus 73 are conveniently bi-level signals that switch the bridge control between normal and fly-back modes. Normal mode operation is shown in FIGS. 4-5 and 7-8. FIGS. 8-9 show fly-back operation. Fly-back operation is selected, for example, when the logic test illustrated in block 316 of FIG. 12 is affirmative. Torque loop and commutation logic 72 receives the torque input commands on leads or bus 43 and from this determines whether M/G 24 to which control 56 is coupled should act as a motor (accelerate) or a generator (decelerate) or neither. Logic 72 also receives speed related information (e.g., hall sensor data) on leads or bus 42 and converts that to speed information (e.g., RPM) which it also sends to power flow control logic 70 via leads 43A. Logic 72 also provides control signals for H-Bridge M/G driver 56 on leads or bus 57A that tell bridge driver 56 in combination with switch control signals on leads or bus 57B how to configure the H-Bridge and the M/G windings so that M/G 24 operates in the correct mode (e.g., motor or generator) and in the correct direction of rotation. In addition, torque loop and commutation logic 72 desirably but not essentially provides feedback (telemetry) on lead 74 to the supervisory spacecraft management system (not shown) on the status of attitude control system 10.

FIGS. 4-9 are simplified schematic block diagrams of portion 79 of H-bridge M/G driver 58 showing how control 56 configures driver 58 for different modes of operation of M/G 24. In the case of a multi-phase M/G, then H-bridge M/G driver 58 may employ multiple portions 79, with half of the H-Bridge (two switches) connected at each phase terminal] Coil 80 represents motor windings 66 of M/G 24. Within H-Bridge portion 79 are four commutating switches 81, 82, 83, 84. In addition, one or more switches 60B-1, 60B-2, 60B-3 (see FIG. 2) are also shown, coupling motor windings 66, 80 to various power sources $V_{GEN}$, $V_{XFR}$, and $V_{FLTR}$. Commutating switches 81-84 are set open or close in different combinations depending upon the desired mode and phase of operation of M/G 24. Arrow 85 in FIGS. 4-9 shows the assumed direction of current flow through windings 66, 80 for M/G 24 to increase rotor speed. Currents 91-96 shown in FIGS. 4-9 illustrate the direction of current flow through coils 66, 80 and the various switches for different modes of operation of M/G 24. FIGS. 4-9 are intended to be illustrative and not exhaustive, that is, they do not depict all possible modes of operation. However, persons of skill in the art will understand based on the description herein how to arrange the various switches for other modes of operation considered herein.

Figure 4:
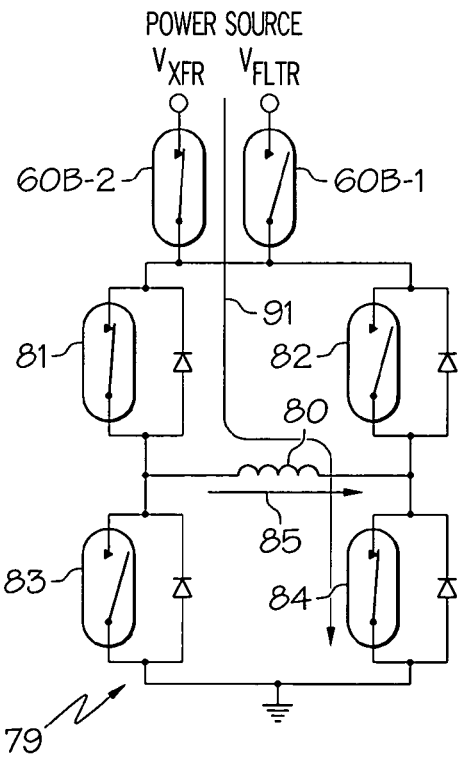
FIGS. 4-9 are simplified schematic block diagrams of an H-bridge motor-generator (M/G) driver of FIG. 2 showing examples of how it is configured differently for different modes of operation of the reaction wheels.
Figure 5:
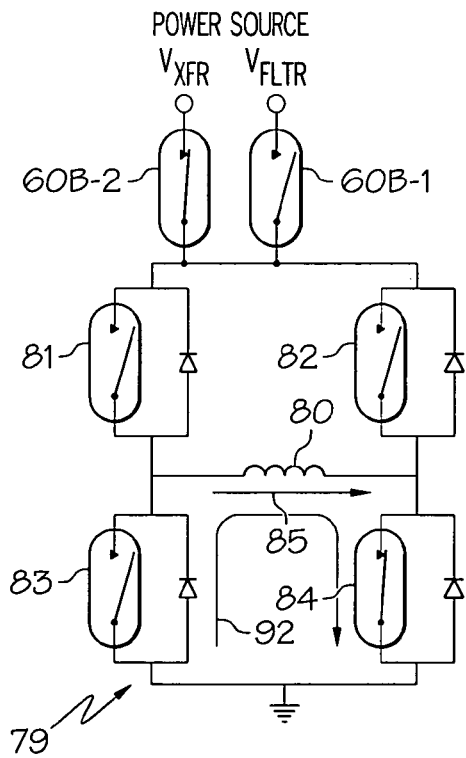

FIGS. 4-5 show the situation when M/G 24 is accelerating. FIG. 4 depicts current flow 91 for the positive portion of a pulse-width modulation (PWM) cycle, for normal operation of an accelerating motor. Current 91 flows through one or the other of switches 60B-2, 60B-1 to ground (spacecraft common) from whichever power source (e.g., $V_{XFR}$, or $V_{FLTR}$) is appropriate depending upon the motor speed, etc. In FIG. 4, this is assumed merely for purposes of illustration to be switch 60B-2, but this is not essential. Switches 82, 83 are open and switches 81, 84 are closed. One or the other of switches 60B-1, 60B-2 to either $V_{XFR}$, and $V_{FLTR}$ is closed. FIG. 5 depicts current flow 92 for the negative portion of the PWM cycle, normal operation, accelerating motor, wherein motor inductor current 92 flows through the commutation diode associated with switch 83. Switches 81, 82, 83 are open and switch 84 is closed. Switches 60B-1, 60B-2 can be open or closed. It does not matter since switches 81, 82 are open.

Figure 6:
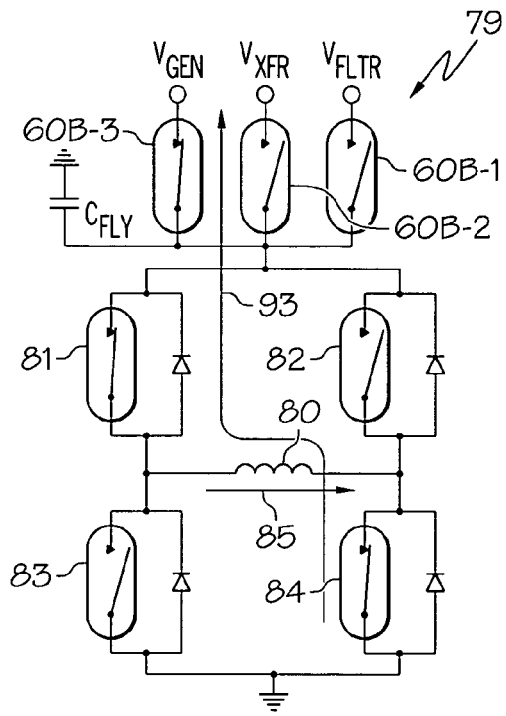
Figure 7:
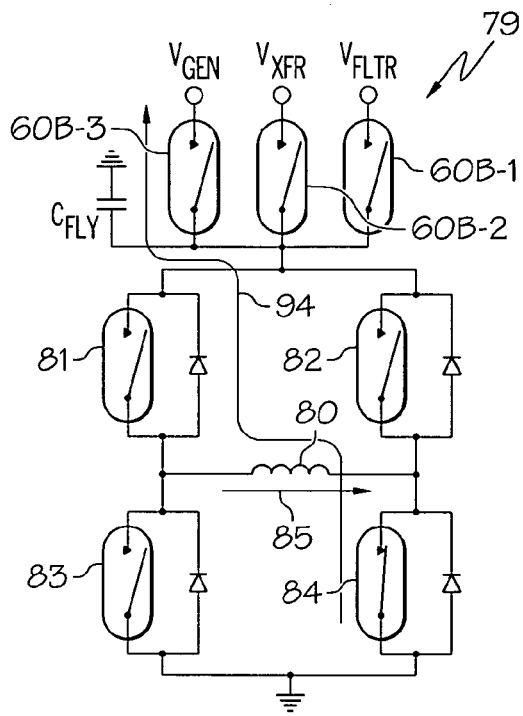

FIGS. 6-7 show the situation when M/G 24 is decelerating but still generating enough voltage to supply current to other RWAs 20. FIG. 6 depicts current flow 93 for the positive portion of the PWM cycle, for normal operation of a decelerating M/G acting as a generator. Current 93 flows from ground through switch 84, through coil 80, through switch 60B-1 to provide $V_{GEN}$ to XFR bus connection 48, as previously explained. Switches 82, 83 are open and switches 81, 84 are closed. Switch 60B-3 to node 65A (see FIG. 2) is closed so that power can flow to XFR bus connection 48. FIG. 7 depicts current flow 94 for the negative portion of the PWM cycle, normal operation, decelerating generator, wherein coil inductor current 94 flows through the commutation diode associated with switch 81 and into capacitor $C_{FLY}$. Switches 81, 82, 83 are open and switch 84 is closed. Switches 60B-1, 60B-2, 60B-3 are conveniently open.

FIGS. 8-9 show the situation when M/G 24 is decelerating but now operating in what is referred to as the "fly-back" mode, that is, where $V_{BEMF}$ is less than $V_{XFR}$ under normal operation. FIG. 8 depicts current flow 95 for the positive portion of the PWM cycle for fly-back operation of a decelerating M/G acting as a generator. Current 95 flows through coil 80 and through switches 83, 84 to ground. Switches 81, 82 are open. Switches 60B-1, 60B-2, 60B-3 may be open or closed (but only one of these may be closed at one time, to avoid shorting the voltage sources to each other). FIG. 9 depicts current flow 96 for the negative portion of the PWM cycle for fly-back operation, decelerating generator, wherein coil inductor current 96 flows through switch 84 and the commutation diode associated with switch 81 and through switch 60B-3 to provide $V_{GEN}$ at node 65A. Switches 81, 82, 83 are open and 60B-1, 60B-2 are conveniently open and switches 84 and 60B-3 are closed. Persons of skill in the art will understand based on the explanation herein, how to configure these various switches for other modes of operation, as for example, when it is desired that M/G 24 act as a motor and accelerate. It will be apparent that the arrangement depicted in FIG. 2 and explained in more detail in connection with FIGS. 3-9 permits energy to be transferred substantially directly from one RWA to another without taxing the spacecraft bus as either a source or sink. Thus, the invention is able to provide higher currents (and thus higher torque which is proportional to current) than can be achieved merely by relying only on the space craft bus as a current source or sink. This is a significant improvement. The spacecraft bus is used as a source and the space craft electrical energy dump is used as a sink when it is no longer possible to provide direct energy transfer among the RWAs, e.g., when decelerating M./Gs acting as generators can no longer provide enough voltage to overcome the back-EMF of M/Gs acting as motors.

Figure 10:
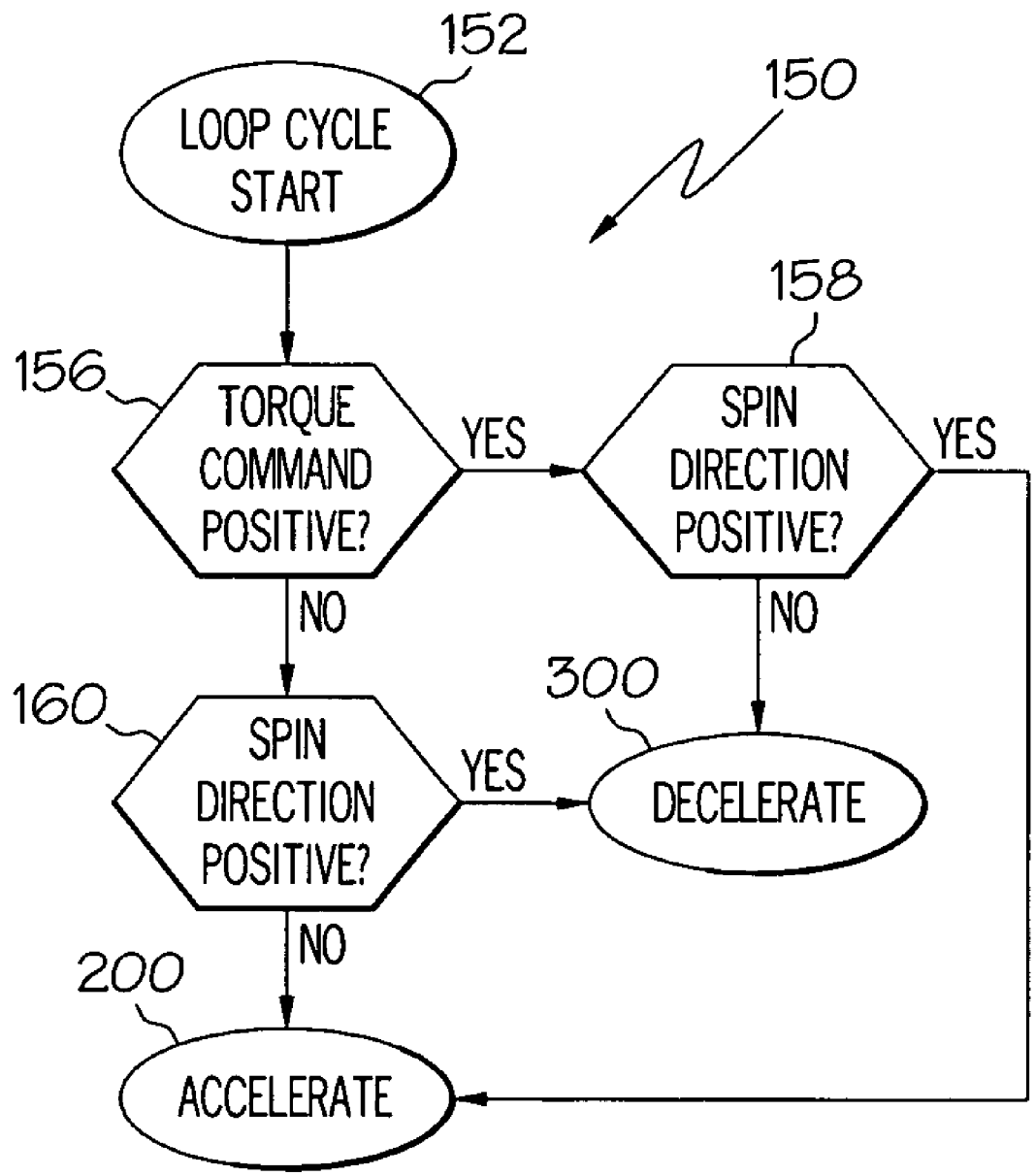
FIGS. 10-12 illustrate the method of the present invention, where
Figure 11:
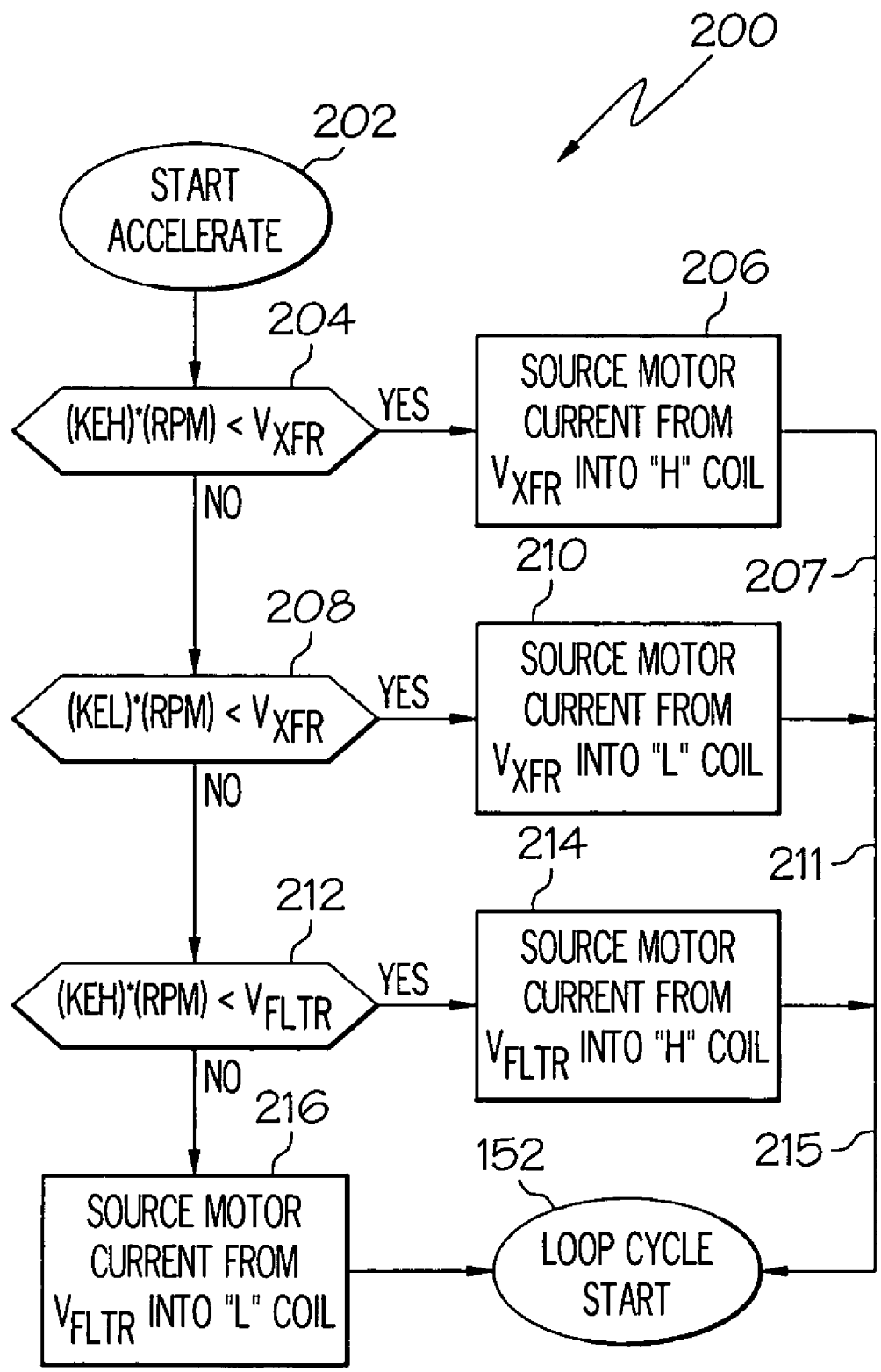

FIGS. 10-12 illustrate the method of the present invention, where FIG. 10 illustrates method 150 for determining whether a reaction wheel should accelerate or decelerate, FIG. 11 illustrates method 200 for an accelerating wheel and FIG. 12 illustrates method 300 for a decelerating wheel. In order to use the stored energy in one wheel to accelerate another wheel, the generator output for the decelerating wheel must be higher than the BEMF of the accelerating wheel. Assume for convenience of explanation and not intended to be limiting, that the various reaction wheels are substantially identical and running at the same initial bias speed. Then the M/G acting as the generator will ordinarily not provide enough voltage to accelerate the M/G acting as the motor unless some means for raising the voltage is provided, as for example is illustrated in FIG. 2. The additional voltage needed can be generated by employing a generator with a higher BEMF constant Ke than that of the motor. Another way of accomplishing this is to use dual windings, that is, a motor-generator with one set of coils or connections producing higher voltage (e.g., the "H" coils of FIG. 2) and another set operating at a lower voltage (e.g., the "L" coils of FIG. 2). Fly-back type voltage step-up arrangements may also be used (see FIG. 9). The desirable condition for wheel acceleration (e.g., see FIG. 11) is to use minimum current consistent with the torque demand to accelerate a wheel, and to source the current from another wheel (via $V_{XFR}$) whenever possible. The desirable condition for wheel deceleration (e.g., see FIG. 12) is to generate maximum current consistent with the torque demand where the current is being sent to another wheel M/G and minimum current consistent with the torque demand where the generated current is being dissipated in power dump resistor ($R_{DUMP}$) 46. In FIGS. 10-12, a dual winding arrangement with "H" and "L" coils or connections is assumed but this is merely for convenience of description and not intended to be limiting and any arrangement may be used for obtaining higher voltage from the M/G acting as a generator and/or reducing the back-EMF of the M/G acting as a motor.

Referring now to method 150 of FIG. 10, this begins with LOOP CYCLE START step 152 which occurs whenever the quiescent status of attitude control system 10 is perturbed, as for example, by receiving an attitude change request or torque command from the space craft attitude control or management system (not shown) to array controller 42 which in turn issues a torque command to one or more RWAs, e.g., RWAs 20. The purpose of method 150 is to determine whether a particular RWA should accelerate or decelerate in order to provide the output torque commanded or requested by array controller 42, with minimum impact on power system bus 44 or power dump 46. It is assumed that the RWAs are initially operating at their predetermined speed bias offset, but this is not essential. Steps 156, 158, 160 of method 150 compare the torque command direction and the spin direction of the reaction wheel (RW) concerned and determine whether the RW should accelerate or decelerate. In general, if the torque command and the spin direction have the same sign, then the RW should accelerate, otherwise it should decelerate. In initial query 156 it is determined whether or not the torque command is positive. If the outcome of query 156 is YES (TRUE) then in query 158 it is determined whether or not the spin direction of the RW concerned is also positive. If the outcome of query 158 is also YES (TRUE), meaning that the torque and spin directions are the same (both positive), then method 150 advances to ACCELERATE step 300 (see FIG. 12), otherwise for a NO (FALSE) outcome of query 158 (directions not the same), method 150 advances to DECELERATE step 200 (see FIG. 11). If the outcome of query 156 is NO (FALSE) then method 150 advances to query 160 wherein it is determined whether or not the spin direction is positive. If the outcome of query 160 is YES (TRUE), meaning that the torque and spin directions are not the same, then method 150 advances to DECELERATE step 200 (see FIG. 11). If the outcome of query 160 is NO (FALSE), meaning that the torque and spin directions are the same (both negative), then method 150 advances to ACCELERATE step 300 (see FIG. 12).

Referring now to accelerating wheel method 200 of FIG. 11, method 200 begins with START ACCELERATE step 202 that conveniently occurs when an ACCELERATE outcome is obtained in method 150. Initial query 204 determines whether or not $(KeH)*(RPM)<V_{XFR}$, where KeH is the motor BEMF constant corresponding to the higher voltage ("H") windings or higher voltage feedback from M/G 24 however derived, RPM is the rotational speed, e.g., revolutions per minute, and $V_{XFR}$ is the voltage on the RWA coupling bus, e.g., at connection 48 in FIGS. 1-2. If the outcome of query 204 is YES (TRUE) then method 200 advances to block 206 wherein control 26, 56, 58 closes the appropriate switches 60 so that the M/G acting as a motor and desired to be accelerated has its "H" coil coupled to transfer bus (XFR) connection 48 where $V_{XFR}$ is present, so that $V_{XFR}$ is applied to the "H" coils and the relevant M/G is running as a motor. Method 200 then advances as shown by path 207 to LOOP CYCLE START step 152 of method 150 of FIG. 10 and the initial steps are repeated (the outcome may be the same or different). If the outcome of query 204 is NO (FALSE), meaning that the back EMF of the "H" connection of the M/G concerned is already equal to or greater than $V_{XFR}$, then method 200 advances to query 208 wherein it is determined whether or not $(KeL)*(RPM)<V_{XFR}$, where KeL is the motor BEMF constant corresponding to the lower voltage ("L") windings or lower voltage connection to M/G 24. If the outcome of query 208 is YES (TRUE) then method 200 advances to step 210 wherein controls 26, 56, 58 close the appropriate switches 60 so that the M/G acting as a motor and desired to be accelerated has its "L" coil or other low voltage connection coupled to transfer bus (XFR) connection 48 where $V_{XFR}$ is present, so that $V_{XFR}$ is applied to the "L" coils or other low voltage connection and the relevant M/G continues to run as a motor. Method 200 then advances as shown by path 211 to LOOP CYCLE START step 152 of method 150 of FIG. 10 and the initial steps are repeated (the outcome may be the same or different). If the outcome of query 208 is NO (FALSE), then method 200 advances to query 212 wherein it is determined whether or not $(KeH)*(RPM)<V_{FLTR}$. If the outcome of query 212 is YES (TRUE) meaning that the back EMF of the "H: coils of the motor is less than $V_{FLTR}$, then method 150 advances to step 214 wherein controls 26, 56, 58 close the appropriate switches 60 so that the M/G acting as a motor and desired to be accelerated has its "H" coil or other high voltage connection coupled to $V_{FLTR}$ derived from $V_{BUS}$. The M/G continues to accelerate but now driven by spacecraft power bus 44 since the decelerating reaction wheels acting as generators can no longer directly provide energy to it via transfer bus connection 48. Method 200 then advances as shown by path 215 to LOOP CYCLE START step 152 of method 150 of FIG. 10 and the initial steps are repeated (the outcome may be the same or different). If the outcome of query 212 is NO (FALSE), meaning that the back EMF from the "H: coils is equal or larger than $V_{FLTR}$, then method 200 proceeds to step 216 wherein controls 26, 56, 58 close the appropriate switches 60 so that the M/G acting as a motor and desired to be accelerated has its "L" coil or other low voltage connection coupled to $V_{FLTR}$. Following step 216, method 200 proceeds to LOOP CYCLE START step 152 and the initial steps repeat (with the same or different outcome).

Referring now to decelerating wheel method 300 of FIG. 12, method 300 begins with START DECELERATE step 302 that conveniently occurs when a DECELERATE outcome is obtained in method 150. Initial query 304 determines whether or not $((KeL)*(RPM)/R_{DUMP}) < I_{CMD}$, where $I_{CMD}$ is the RWA torque command times 1/(RWA torque constant). If the outcome of query 304 is YES (TRUE), meaning that the BEMF is not high enough to generate sufficient torque to meet the commanded torque by decelerating the wheel then method 300 goes to START ACCELERATE 202. If the outcome of query 304 is NO (FALSE) then method 300 advances to query 308 wherein it is determined whether or not $(KeL)*(RPM) \geq V_{XFR}$. If the outcome of query 308 is YES (TRUE), meaning that the back EMF output voltage from the "L" coils of M/G 24 already equals or exceeds the transfer bus voltage $V_{XFR}$ (created by the back EMF of other RWAs) and M/G 24 is capable of acting as a generator, then method 300 proceeds to step 310 wherein controls 26, 56, 58 close the appropriate switches 60 so that $V_{GEN}$ produced by the "L" coil(s) of M/G 24 is coupled to XFR connection 48 to provide $V_{XFR}$ thereon. Method 300 then proceeds as shown by path 311 to LOOP CYCLE START step 152. If the outcome of query 308 is NO (FALSE), meaning that the "L" coil or other low voltage output is less than $V_{XFR}$, then method 300 proceeds to query 312 wherein it is determined whether or not $(KeH)*(RPM) \geq V_{XFR}$. If the outcome of query 312 is YES (TRUE), meaning that the output voltage from the "H" coils of M/G 24 equals or exceeds the transfer bus voltage $V_{XFR}$ created by the back EMF of other RWAs coupled to the transfer bus, and M/G 24 is capable of continuing to act as a generator using the "H: coils, then method 300 proceeds to step 314 wherein controls 26, 56, 58 close the appropriate switches 60 so that $V_{GEN}$ produced by the "H" coil or other high voltage output of M/G 24 is coupled to XFR connection 48 to provide $V_{XFR}$ thereon. Method 300 then proceeds as shown by path 315 to LOOP CYCLE START step 152. If the outcome of query 312 is NO (FALSE), meaning that the "H" coil or other high voltage output is less than $V_{XFR}$, then method 300 proceeds to query 316 wherein it is determined whether or not $V_{XFR}$ from the M/G acting a a generator is less than $V_{MAXLIMIT}$, where $V_{MAXLIMIT}$ is the maximum voltage allowed on the XFR bus. If the outcome of query 316 is YES (TRUE), meaning that $V_{XFR}$ voltage is still less than the maximum allowed voltage, then method 300 proceeds to step 318 wherein controls 26, 56, 58 close the appropriate switches 60 so that the "L" coil or other low voltage output of M/G 24 is coupled to XFR connection 48 to provide $V_{XFR}$ thereon and H-bridge driver 58 is set for fly-back operation (see FIGS. 8-9). Method 300 then proceeds as shown by path 319 to LOOP CYCLE START 152 of method 150 of FIG. 10 and the initial steps are repeated (the outcome may be the same or different). If the outcome of query 316 is NO (FALSE) then method 300 advances to step 320 wherein controls 26, 56, 58 close the appropriate switches 60 so that the "H" coil or other high voltage output of M/G 24 is coupled to $R_{DUMP}$ 46 and H-bridge driver 58 is set for fly-back operation. Method 300 then proceeds to LOOP CYCLE START 152 of method 150 of FIG. 10 and the initial steps are repeated (the outcome may be the same or different). The RWA responds to torque commands. As long as there is a non-zero torque command and the wheel is not being commanded to exceed its maximum speed, it will accelerate/decelerate as commanded. The array controller conveniently resets the wheels back to quiescent speed (e.g., via appropriate torque commands) during periods where the spacecraft is requesting little or no torque from the array.

Persons of skill in the art will appreciate based on the description of the invention provided herein that maximum deceleration or acceleration or any intermediate level thereof may be obtained in response to a torque or other attitude change command in such a way that maximum use is made of the energy already stored in the reaction wheels. Those wheels that need to decelerate are used to substantially directly drive those wheels that need to accelerate, rather than rely on the spacecraft power bus or dissipation capability. The method and apparatus described herein take into account the BEMF presented by the reaction wheels acting as motors and adjust the generator and motor connections or voltages to accommodate this BEMF. The apparatus and method described here also provide for appropriate connections to the spacecraft power bus and power dump when substantially direct wheel-to-wheel exchange of energy is no longer possible because the BEMF exceeds the available generator voltage. As used herein, the words "substantially direct" and "direct" referring to the transfer of energy from one RW to another includes intermediate power conditioning for raising or lowering voltages so that the decelerating M/G can overcome the BEMF of the accelerating M/G as much as possible.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A spacecraft attitude control apparatus, comprising:
   first and second reaction wheel assemblies (RWA) comprising:
      first and second reaction wheels;
      first and second motor-generators (M/Gs) rotationally coupled to the first and second reaction wheels, respectively, for adding energy to or removing energy from the first and second reaction wheels, respectively; and
      first and second power flow controllers electrically coupled to the first and second M/Gs respectively, and adapted to control operation of the first and second M/Gs as motors or generators; and
   a power bus coupling to the first and second power flow controllers of the first and second RWAs for transferring energy between the first and second M/Gs, whereas when a torque command is received requiring that the first RWA decelerate and the second RWA accelerate, the first power flow controller configures the first M/G as a decelerating generator and the second power flow controller configures the second M/G as an accelerating motor and power flows from the decelerating first M/G to the accelerating second M/G via the power bus while an output voltage derived from the first decelerating M/G exceeds a back EMF of the second accelerating M/G.

2. The apparatus of claim 1, wherein each power flow controller comprises:
an input port for receiving $V_{BUS}$ provided by a spacecraft power supply to which the accelerating second M/G can be coupled by the second power flow controller when a voltage generated by the decelerating first M/G no longer exceeds the back EMF of the accelerating second M/G.

3. The apparatus of claim 2, wherein each power flow controller comprises:
an output port coupled to a resistive load $R_{DUMP}$ to which the decelerating first M/G can be coupled by the first power flow controller when the voltage produced by the decelerating first M/G no longer exceeds the back EMF of the accelerating second M/G.

4. The apparatus of claim 1, wherein each M/G has low ("L") voltage and high ("H") voltage windings.

5. The apparatus of claim 4, wherein the first power flow controller couples the H-voltage windings of the decelerating first M/G to the L-voltage windings of the accelerating second M/G while the voltage produced by the decelerating first M/G exceeds the back EMF of the accelerating second M/G.

6. The apparatus of claim 1, wherein each power flow controller has a further output for providing telemetry data on the status of the first and second RWAs.

7. A group of electrically coupled reaction wheel assemblies:
wherein each reaction wheel assembly (RWA) comprises:
an inertia wheel adapted to store momentum therein when rotating;
a motor-generator (M/G) rotationally coupled to the inertia wheel and adapted to increase or decrease or maintain the momentum stored in the inertia wheel;
a controller electrically coupled to the M/G and having an input adapted to receive momentum transfer commands and an I/O adapted to receive energy from or export energy to other reaction wheel assemblies of the group and couple it to the M/G so as to change the momentum of the reaction wheel according to said commands; and
wherein the group further comprises:
an energy transfer bus extending between the I/Os of the individual reaction wheel assemblies for transferring energy therebetween.

8. The assembly of claim 7, wherein the controller further comprises:
an output port coupled to a resistive load $R_{DUMP}$ to which a decelerating M/G can be coupled by the controller when a voltage produced by the decelerating M/G no longer exceeds a back EMF of an accelerating M/G of another reaction wheel assembly of the group electrically coupled to the controller by the energy transfer bus.

9. The assembly of claim 7, wherein the controller further comprises:
an input port for receiving $V_{BUS}$ provided by a power supply external to the RWA to which an accelerating M/G can be coupled by the controller when a voltage generated by a decelerating M/G of another reaction wheel assembly electrically coupled to the controller by the energy transfer bus no longer exceeds a back EMF of the accelerating M/G.

10. The assembly of claim 7, wherein the M/G of each RWA of the group has low ("L") voltage and high ("H") voltage connections.

11. The assembly of claim 10, wherein the controller couples the H-voltage connection of a decelerating M/G to the L-voltage connection of an accelerating M/G of another RWA of the group, while the voltage produced by the decelerating M/G exceeds the back EMF of the accelerating M/G.

12. The assembly of claim 7, wherein the controller of a first RWA substantially directly couples its M/G acting as a generator via its I/O and the energy transfer bus to the I/O of a second RWA of the group whose controller configures its M/G to act as a motor and receive energy from the M/G of the first RWA so long as a voltage produced by the M/G of the first RWA exceeds a back EMF of the M/G of the second RWA.

13. The assembly of claim 7, wherein the controller compares a torque direction requested by a command with a current spin direction of the M/G and its coupled reaction wheel, and if the torque and spin have the same sign, configures the M/G as a motor to accelerate its coupled inertia wheel and if they have different signs, configures the M/G as a generator to decelerate its coupled inertia wheel.

14. A method for exchanging energy, in response to a command, between at least first and second reaction wheel assemblies (RWA) joined by an energy transfer bus, wherein each reaction wheel assembly comprises a reaction wheel rotationally coupled to a motor-generator (M/G) coupled to the energy transfer bus, the method comprising:
configuring a first M/G of the first RWA as a generator to provide energy to the transfer bus while decelerating;
configuring a second M/G of the second RWA as a motor to receive energy from the transfer bus while accelerating; and
sending energy from the first RWA to the second RWA over the energy transfer bus.

15. The method of claim 14, wherein the first M/G comprises low voltage ("L") and high voltage ("H") connections and wherein the first configuring step further comprises:
coupling the "H" voltage connection of the first M/G to the transfer bus while decelerating.

16. The method of claim 14, wherein the second M/G comprises low voltage ("L") and high voltage ("H") connections and wherein the second configuring step further comprises:
coupling the "L" voltage connection of the second M/G to the transfer bus while accelerating.

17. The method of claim 14, wherein the second M/G comprises low voltage ("L") and high voltage ("H") coils, KeH is the back EMF of the "H" coils of the second M/G, KeL is the back EMF of the "L" coils of the second M/G, RPM is the rotational speed of the second M/G, $V_{XFR}$ is the voltage on the transfer bus coupling the first and second M/Gs, and $V_{FLTR}$ is a power supply voltage, and wherein the second configuring step further comprises for the second M/G:
if $(KeH)*(RPM) < V_{XFR}$, coupling $V_{XFR}$ to "H" coils of the second M/G; and
if $(KeH*(RPM) \geq V_{XFR}$ and $(KeL)*(RPM) < V_{XFR}$, then coupling $V_{XFR}$ to "L" coils of the second M/G.

18. The method of claims 17, further comprising:
if $(KeL)*(RPM) \geq V_{XFR}$ and $(KeH)*(RPM) < V_{FLTR}$, then coupling $V_{FLTR}$ to "H" coils of the second M/G; and
if $(KeH)*(RPM) \geq V_{FLTR}$, then coupling $V_{FLTR}$ to "L" coils of the second M/G.

19. The method of claim 14, wherein the first M/G comprises low voltage ("L") and high voltage ("H") coils, KeH is the back EMF of the "H" coils of the first M/G, KeL is the back EMF of the "L" coils of the first M/G, RPM is the rotational speed of the first M/G, $V_{XFR}$ is the voltage on the transfer bus coupling the first and second M/Gs, $V_{MAXLIMIT}$ is a maximum allowed voltage on the transfer bus and $R_{DUMP}$ is the resistance of an electrical power dump, and wherein the first configuring step further comprises for the first M/G:

if $(KeL)*(RPM) \geq V_{XFR}$, coupling "L" coils of the first M/G to $V_{XFR}$; and if $(KeL)*(RPM) < V_{XFR}$ and $(KeH)*(RPM) \geq V_{XFR}$, then coupling "H" coils of the first M/G to $V_{XFR}$.

20. The method of claim 19, further comprising:

if $(KeH)*(RPM) < V_{XFR}$ and $V_{XFR} < V_{MAXLIMIT}$, then coupling "L" coils of the first M/G to $V_{XFR}$ and set a driver bridge for the first M/G to fly-back operation; and if $V_{XFR} \geq V_{MAXLIMIT}$, then coupling "H" coils of the first M/G to $R_{DUMP}$.

* * * * *